United States Patent [19]

Pierce

[11] 4,107,473

[45] Aug. 15, 1978

[54] TWO-WAY PAGING SYSTEM TRANSMISSION DIRECTION SENSING AND CONTROL APPARATUS AND METHOD

[75] Inventor: Ben Arthur Pierce, Agua Dulce, Calif.

[73] Assignee: Dracon Industries, Chatsworth, Calif.

[21] Appl. No.: 792,401

[22] Filed: Apr. 29, 1977

[51] Int. Cl.² ............................................. H04M 3/42
[52] U.S. Cl. ............................................... 179/18 BF
[58] Field of Search ........... 179/18 AH, 1 CN, 1 HF, 179/18 BF

[56] References Cited

U.S. PATENT DOCUMENTS

| 3,395,255 | 7/1968 | Clement | 179/1 VC X |
|---|---|---|---|
| 3,714,380 | 1/1973 | Berryman et al. | 179/18 AH |
| 4,008,376 | 2/1977 | Flanagan et al. | 179/1 CN |

OTHER PUBLICATIONS

IEEE Standard Dictionary of Electrical and Electronics Terms, pp. 402–405.

*Primary Examiner*—William C. Cooper
*Attorney, Agent, or Firm*—Flehr, Hohbach, Test, Albritton & Herbert

[57] ABSTRACT

A paging system is entered through appropriate telephone equipment at a master station to supply an audio paging output at a remote station. A paging amplifier is connected to drive a speaker at the remote station to provide the audio output. A direction sensing circuit is disposed between the master and remote stations which operates to sense time relationship between two signals appearing at two separate points within the direction sensing circuit. One time relationship between the two signals indicates a master station transmission and control, and another time relationship indicates a remote station transmission. The method includes coupling signals from the remote station to first and second points in the control circuit and causing a lag to appear between the two points. Signals from the master station are coupled to the second point in the circuit, and the timing of the signals present at the first and second circuit points are compared to obtain an indication of lead or lag therebetween. A lag between the signals at the two points indicates the presence of remote transmission only, and a timing at the second point in the circuit indicates the presence of a signal from the telephone equipment.

12 Claims, 6 Drawing Figures

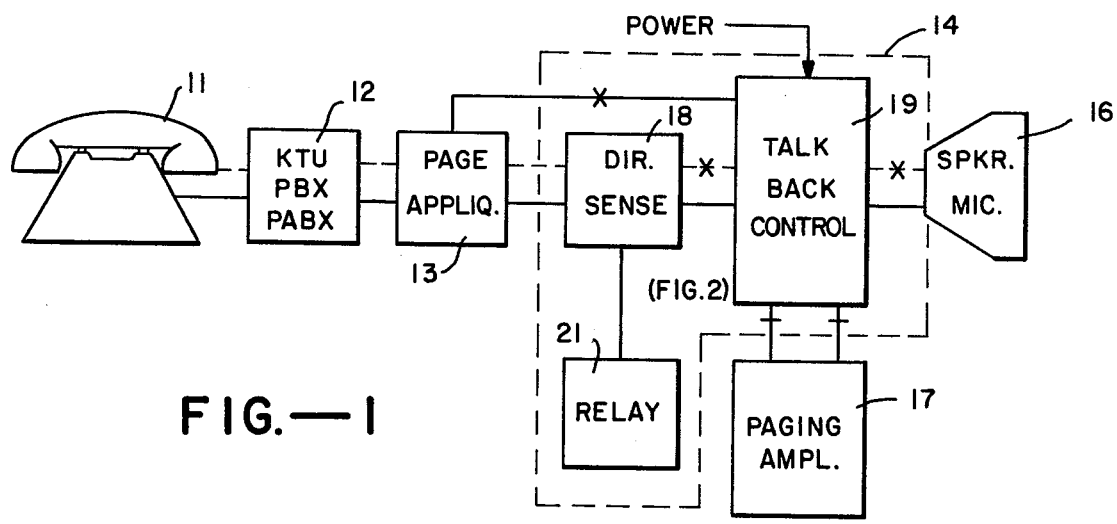
FIG.—1
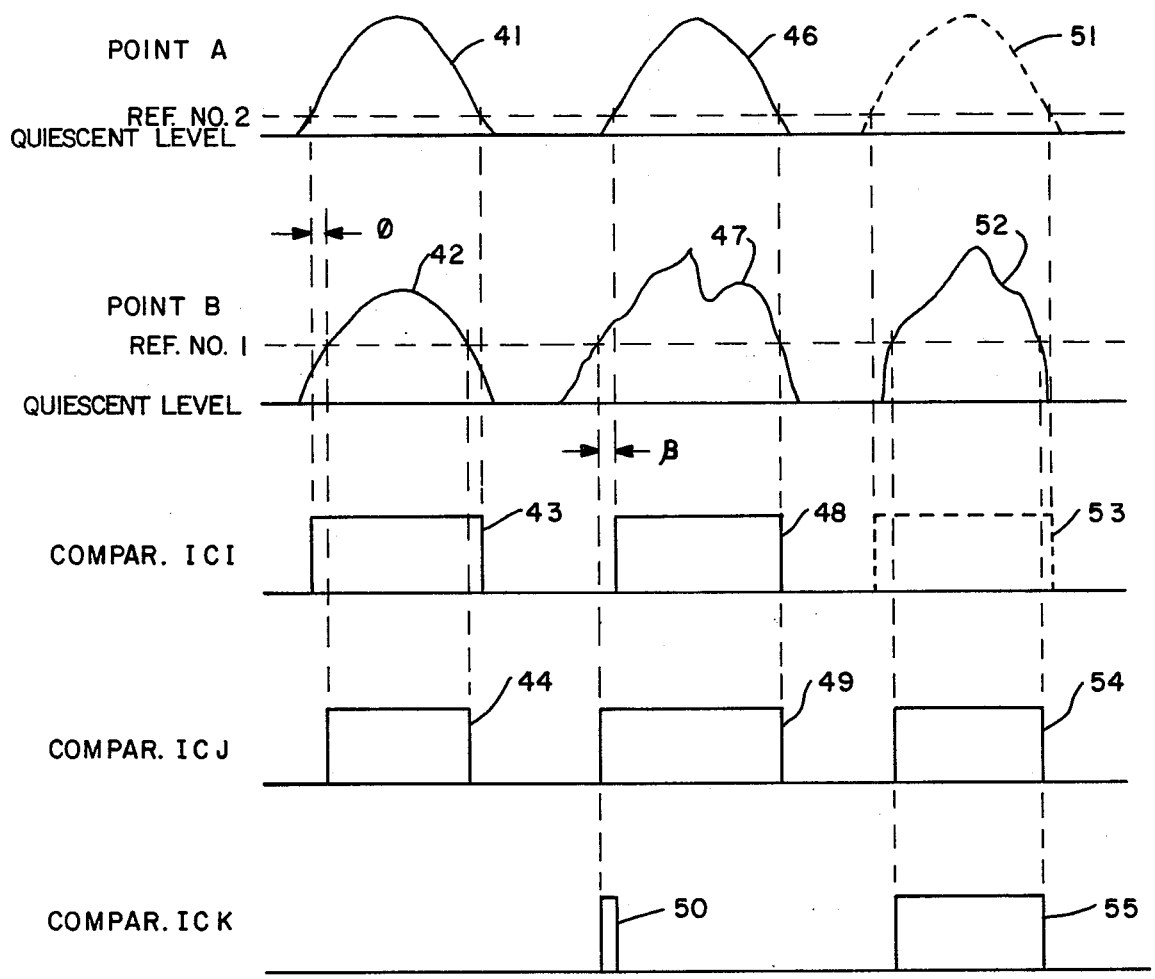
FIG.—6

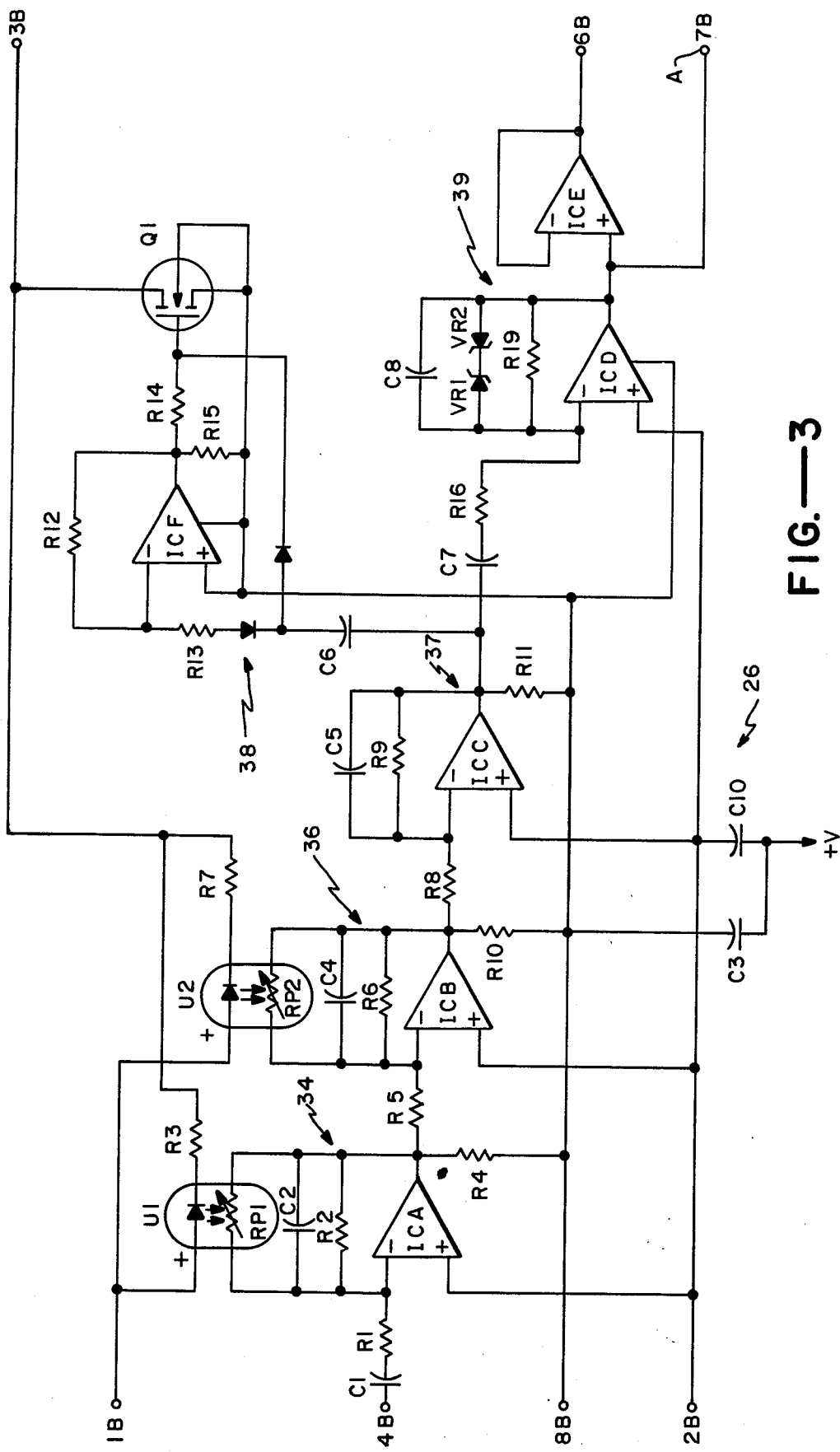
FIG.—3

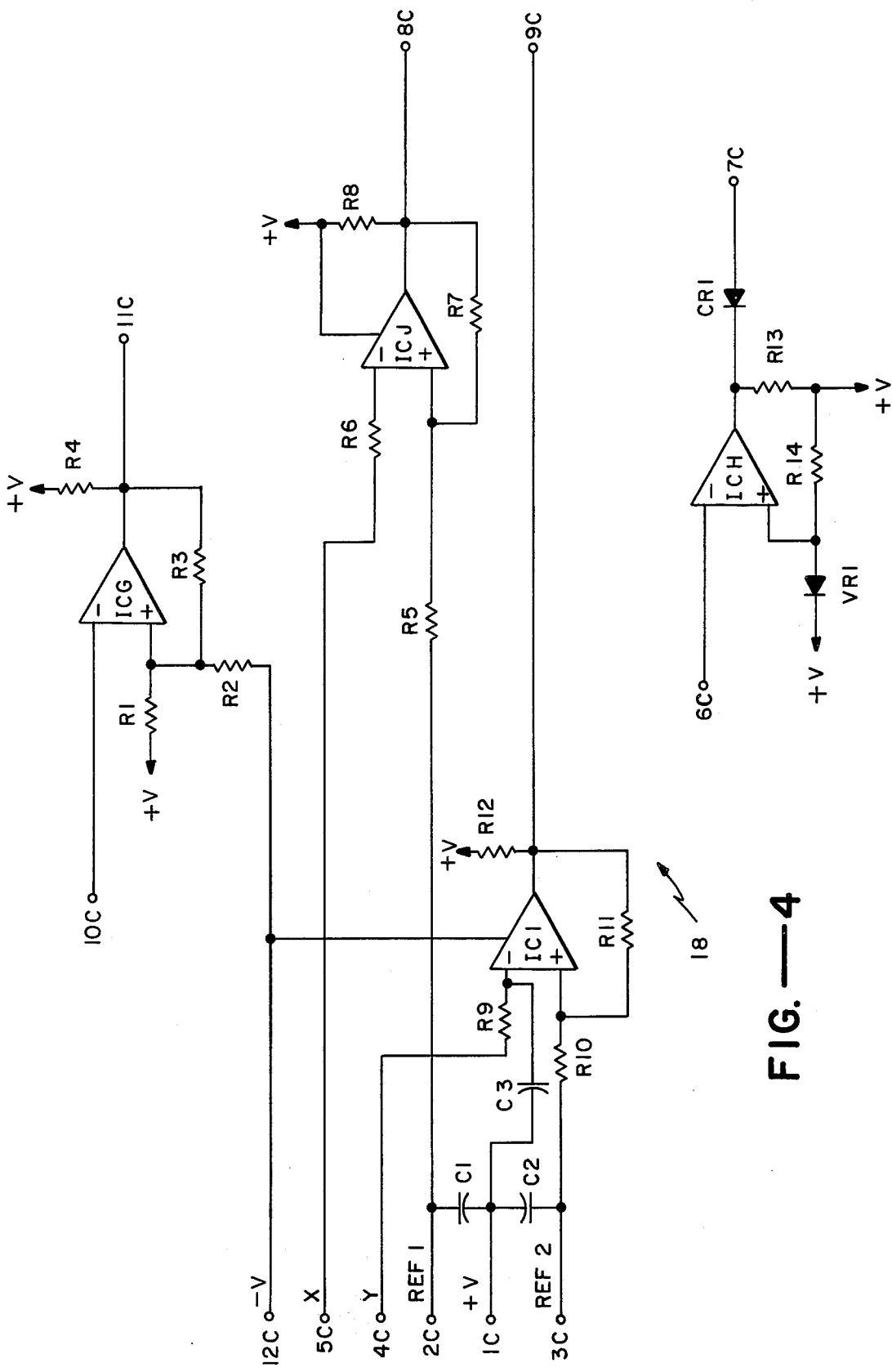
FIG.—4

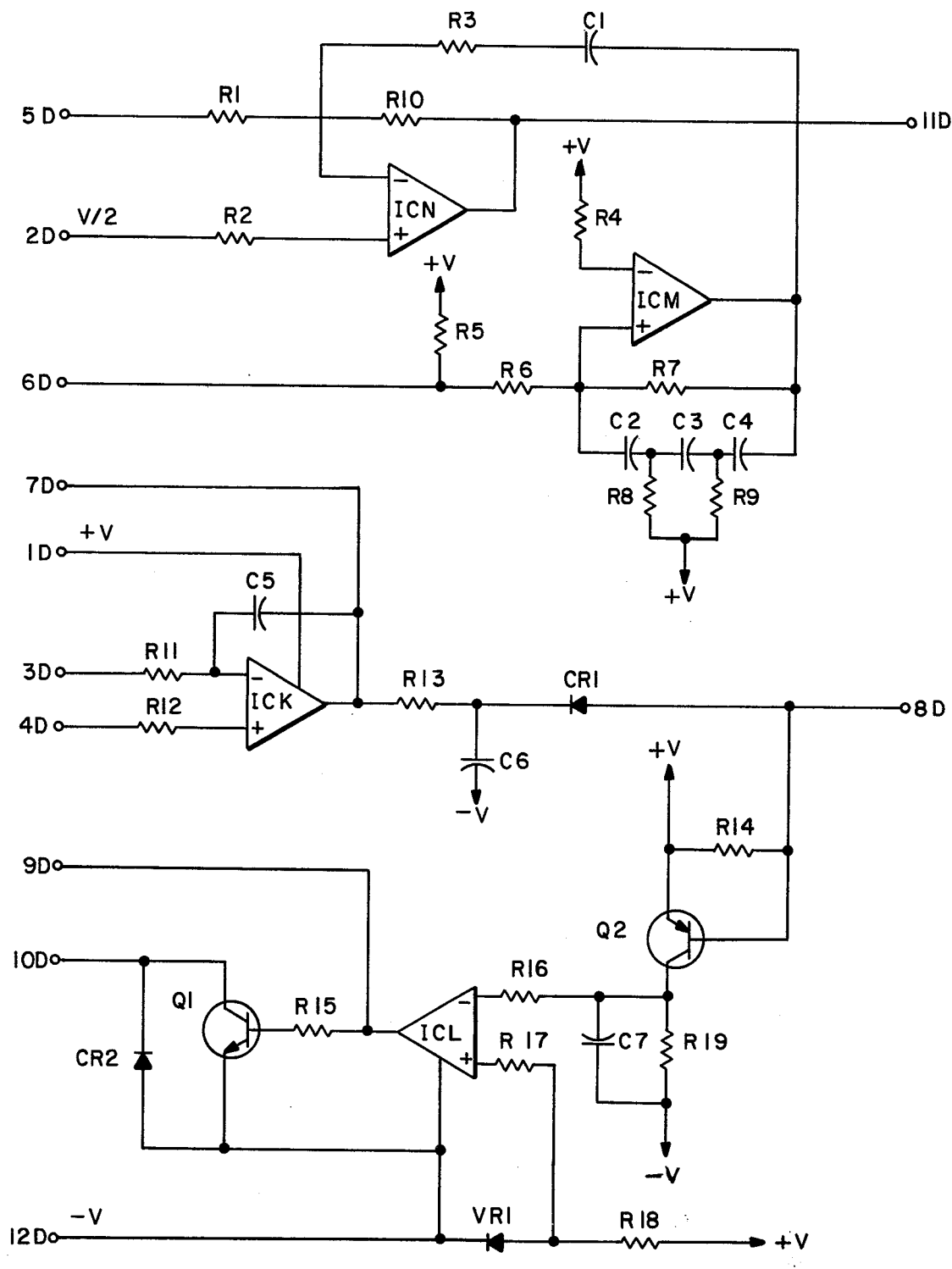
FIG.—5

TWO-WAY PAGING SYSTEM TRANSMISSION DIRECTION SENSING AND CONTROL APPARATUS AND METHOD

BACKGROUND OF THE INVENTION

This disclosure relates to a two wire, two-way paging system between master and remote stations, and more particularly to such a paging system in which direction of transmission is sensed and thereafter controlled by the master station.

Various systems are known which have as their purpose detection of transmission in a two-way paging system so that control may be obtained by one station or the other in the paging system and one transmission will therefore not interrupt another. Moreover, it is desirable to have a master control station which may capture and hold control of the paging system as long as a speaker at the master station continues to talk into the system. One such scheme involves frequency discrimination, wherein a common voice frequency, such as 700 Hertz for example, is filtered out in a very narrow band from the signals originating at the remote station. A transmission detector sensing apparatus is provided to receive the master transmission, which is sensitive only to the 700 Hertz in the master transmission, and the presence of such a frequency causes the control system to place the master in control. The detector is insensitive to transmissions from the remote station, because the selected voice frequency of 700 Hertz is not present. This type of system is proper in theory, but is difficult to attain practically, since voice notch filters for very narrow band filtering are not available with steep enough upper and lower band definition slopes. Moreover, harmonics of the direction sensing frequency might energize the detector providing false directional indication.

Another scheme utilizes voltage level sensing for directional indication. Signals originating at the master station are amplified so that signals normally originating there will exceed a predetermined voltage level, such as 3 volts for example. The system attempts to insure that the transmission signals originated at the remote station are always below the predetermined voltage level of about 3 volts. Therefore, master station signals appearing above the 3 volt level will capture and hold control of the system for the master station. Remote station signals below the 3 volt level will allow the remote station to assume control and transmit information from the remote to the master station. Problems arise when signals at the remote station exceed the predetermined voltage level of 3 volts, in this example, due to high sound energy levels. The remote station therefore may gain control in the middle of a transmission when loud or sharp sounds are made at the remote station, thereby cutting off transmission. Moreover, equipment at the master station must not present an impedance to the system outside the range of approximately 300–900 ohms.

A practical sensing and control system is necessary for a two-way paging network which is not dependent upon transmission level or frequency discrimination for transmission direction sensing, and which allows equipment at the master station to present an impedance coupled to the paging lines which may assume a value within a wide impedance range.

SUMMARY AND OBJECTS OF THE INVENTIONS

Disclosed herein is a voice paging and response system control which is adapted to be installed between a telephone at a master station and a speaker/microphone at a remote station, and which operates in conjunction with a paging amplifier to drive the remote speaker. An amplifier is connected to receive signals from the remote station and to provide an amplified remote signal. A device for sensing the amplified remote signal provides a remote signal timing indicative output, and another device for sensing the phase of a paging signal initiated at the telephone provides a paging signal timing indicative output. Means is provided for comparing the paging and remote signal indicative outputs, and for providing a control signal output when the paging signal indicative output leads the remote signal phase indicative output. Means is provided which operates in response to the control signal to couple the paging amplifier to the speaker when paging signal leads, so that master station transmission is reproduced at the remote station. The last named means also operates to decouple the paging amplifier and to couple the remote signals to the amplifier and consequently to the telephone in the absence of the control signal.

The method involves coupling the remote signal to first and second nodes in the control circuit and imposing a timing lag in the remote signal at the second node. The method further includes the steps of coupling the master signal to the second node also, and thereafter comparing the timing of the signals at the first and second nodes to obtain an indication of lead or lag therebetween. A lag in the signal received at the second node indicates a quiescent master signal and a lead indicates transmission from the master station. The remote signal is coupled to the master station or telephone in response to lag indication and the remote signals are decoupled from the circuit and the master signal is coupled to the remote speaker in response to a lead indication.

In general it is an object of the present invention to provide a two-way paging system transmission direction sensor and control which is operated by the timing relationship between the master and remote station transmissions.

Another object of the present invention is to provide a two-way paging system direction sensor and control which is capable of operating with a predetermined value of impedance for telephone equipment connected thereto which may have a value within a wide impedance range.

Another object of the present invention is to provide a two-way paging system transmission direction and control which is relatively insensitive to variation in audio input at the remote station.

Another object of the present invention is to provide a two-way paging system transmission direction sensor and control which prevents covert listening by a master station.

Additional objects and features of the invention will appear from the following description in which the preferred embodiment has been set forth in detail in conjunction with the accompanying drawings.

BRIEF DESCRIPTION OF THE DRAWINGS

FIG. 1 is a block diagram showing the transmission direction sensing and control installed between telephone equipment at a master station and a speaker/microphone at a remote station.

FIG. 3 is an electrical schematic diagram of the high gain compression amplifier of FIG. 2.

FIG. 4 is an electrical schematic diagram of the tone oscillator timers and voice switch of FIG. 2.

FIG. 5 is an electrical schematic diagram of the tone oscillator, paging amplifier driver and transmission direction control of FIG. 2.

FIG. 6 is a timing diagram showing the generation of the transmission direction control signal.

DESCRIPTION OF THE PREFERRED EMBODIMENT

Figure 2:
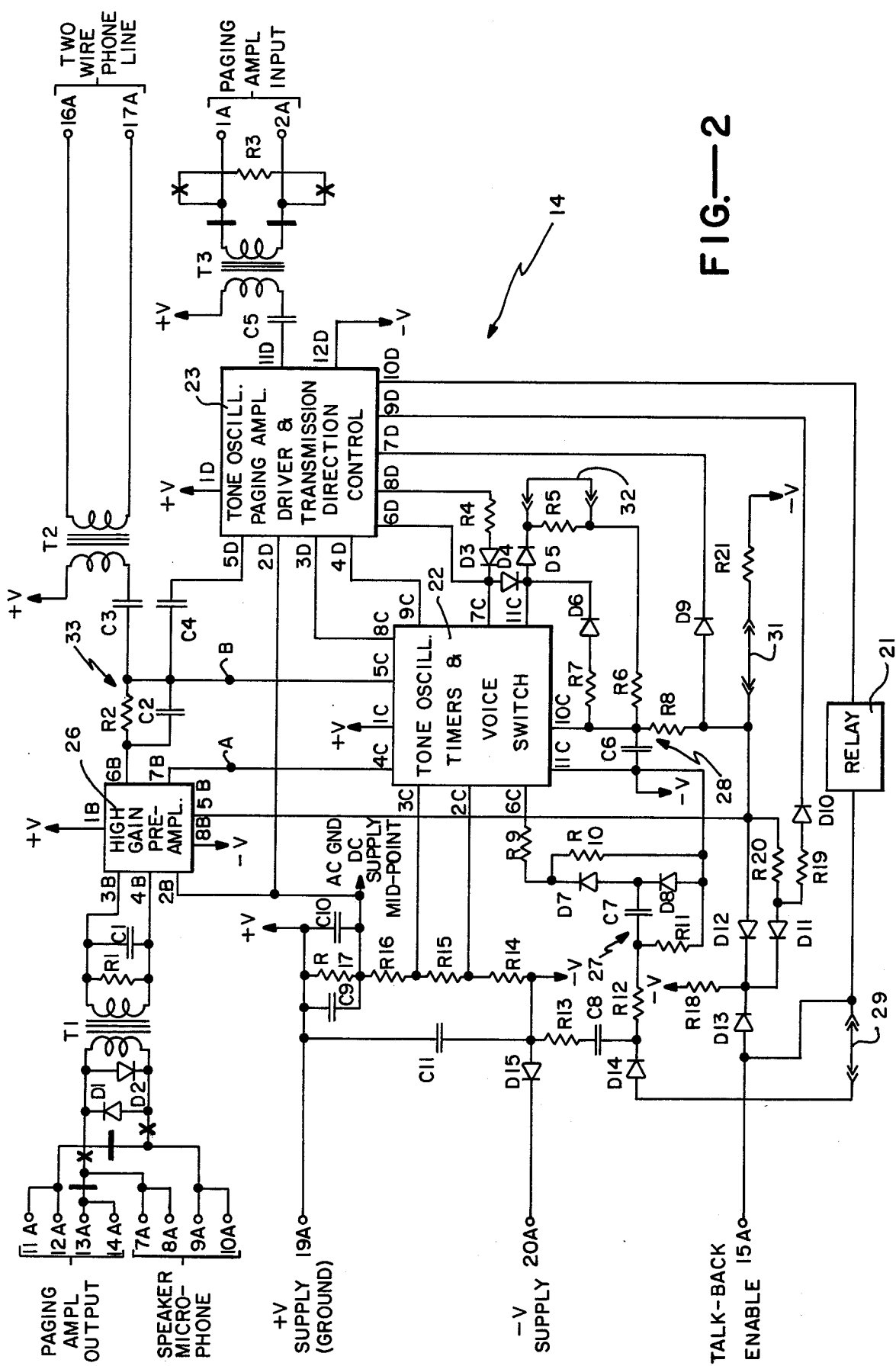
FIG. 2 is a combination block and electrical schematic diagram of the transmission direction sensor and control.

FIG. 1 shows a two-way paging system of the two wire type having a telephone 11 at a master station for the paging system. Telephone 11 generally has standard key telephone unit and/or private branch exchange circuitry (KTU, PBX) 12 associated therewith. A page applique 13 is also joined with the telephone equipment at the master station end of the two wire paging system for the purpose of affording selection of the telephone paging system. A paging direction sensing and control section 14 is disposed between telephone 11 at the master station and a speaker/microphone 16 at a remote station. The speaker/microphone 16 has associated therewith a paging amplifier 17 which drives speaker 16 when telephone 11 at the master station is in control as determined by transmission direction sensing and control section 14.

Transmission direction sensing and control section 14 is seen to include a direction sensing module 18, a talk-back control module 19 and a relay 21. Transmission direction sensed by direction sensing module 18 is transferred into a control signal by talk-back control module 19, which excites relay 21 to actuate the relay contacts shown as normally closed by the horizontal dash marks and normally open by the X marks.

Turning now to the combination schematic and block diagram of FIG. 2, the normally closed contacts represented by the horizontal dashes are shown operating to connect signals from the output of paging amplifier 17 at terminals 11A and 12A to terminals 9A and 10A which are connected to speaker 16. The paging amplifier 17 also has output connected to terminals 13A and 14A which are in turn connected through a normally closed relay contact to speaker terminals 7A and 8A in this embodiment. Input for paging amplifier 17 is provided at terminals 1A and 2A of FIG. 2 through transformer T3 which is connected thereto. A two wire telephone line from telephone 11 is coupled to terminals 16A and 17A and transmissions initiated at the master station in telephone 11 are coupled to the circuit of FIG. 2 through transformer T2. Talk-back enable is provided at terminal 15A of FIG. 2 which is shown extending from talk-back control 19 to page applique 13 in FIG. 1. Plus DC supply is connected to terminal 19A of FIG. 2, and the negative DC supply is connected to terminal 20A.

It may be seen that when the master station is in control, telephone 11 initiates a paging signal which is delivered to paging amplifier 17 and speaker 16 in sequence when the normally closed relay contacts are in the closed position. Signals from a tone oscillator timer and voice switch 22 and a tone oscillator, paging amplifier driver and transmission direction control 23 are capacitor coupled to transformer T3, and coupled through the secondary thereof and the closed relay contacts as shown, to the input of paging amplifier 17 at terminals 1A and 2A of FIG. 2. The relay 21 is shown in the circuit providing for actuation of the normally closed and normally opened relay contacts as mentioned above.

When relay 21 is energized to open the normally closed contacts and to close the normally open contacts, paging amplifier 17 may be seen to be isolated from FIG. 2 at the output terminals thereof, 11A through 14A. Speaker/microphone 16 provides remote signals initiated at the microphone 16 which are coupled to transformer T1 from microphone terminals 7A through 10A, and the now closed normally open contacts X. AC signals coupled through transformer T1 are delivered to a high gain preamplifier 26 which receives various input reference voltage levels as shown. In this embodiment, the plus V supply is utilized as ground reference, and pin 2B of high gain preamplifier 26 serves as a DC supply mid-point between plus V and minus V, and as an AC signal ground due to the shunting of AC signals by capacitors C9 and C10 which are in parallel with resistor R17. Resistors R14 through R17 provide a voltage divider in which the common points between R14 and R15 and between R15 and R16 provide "high" and "low" voltage comparator reference levels respectively which are utilized by components in the voice switch 22. A pair of timing circuits 27 and 28, containing capacitor C7 and resistors R10 and R11, and containing capacitor C6 and resistors R5, R6, R7 respectively, are coupled to tone oscillator timers 22. An initial warning tone patch 29 is shown which must be installed for a warning tone to be generated. Without patch 29 there is no charging path for the timing circuit 27. A warning tone repetition patch 31 functions to provide, when removed, a repetition of the warning tone. A repetition time adjustment patch 32 is provided which provides shorter repetition time with patch 32 installed and a longer repetition time with it omitted. For example, the components R5, R6 and R7 associated with timing circuit 28 may have values so as to provide a warning tone repetition period of 30 seconds without warning tone repetition time patch 32 installed, and a warning tone repetition period of 15 seconds with patch 32 installed.

When relay 21 actuates the normally open contacts X to the closed condition, high gain preamplifier 26 provides an output which appears at pins 6B and 7B thereof. Pin 7B is designated for the purposes of this disclosure as point A reference node in the direction sensing module 18 of the transmission direction sensing and control circuit 14. An impedance 33 shown in FIG. 2 as the parallel combination of resistance R2 and capacitance C2 is coupled to the other output at pin 6B of high gain preamplifier 26. A circuit node B is shown at the end of impedance 33 opposite pin 6B on high gain preamplifier 26. Impedance 33 is primarily for the purpose of matching the two wire telephone line through transformer T2 with the circuit of transmission direction sensing and control 14, and also provides the output of high gain preamplifier 26 at both nodes A and B with a phase therebetween shift depending upon the impedance of the telephone equipment at terminals 16A and 17A and the characteristics of impedance 33. Consequently, when relay 21 closes the normally open contacts X, and couples high gain preamplifier 26 to the remote signals initiated at the microphone 16 in the remote station, the complex waveform signals at nodes A and B will be similar, but unavoidably shifted in phase.

Turning now to FIG. 3 of the drawings the terminal numbers on high gain preamplifier 26 correspond to the terminal numbers shown in FIG. 3. The high gain preamplifier 26 includes a compression amplifier first stage 34, a compression amplifier second stage 36, a third amplifier stage 37, a rectifier and analog switch 38, and a peak clipping amplifier 39. Compression amplifier first stage 34 includes a photoconductive cell RP1 contained in a package U1 with an LED as shown. Resistance of photoconductive cell RP1 is determinative of the gain of compression amplifier first stage 34 in accordance with the ratio of R1 to feedback path impedance including RP1. In like manner a photoconductive cell RP2 in compression amplifier second stage 36 is contained in a package U2 containing an LED optically coupled to the photoconductive cell RP2. The gain of compression amplifier second stage 36 is also adjustable as the resistance of photoconductive cell RP2 is adjusted according to the relative values of RP2 and R5. Third amplifier stage 37 couples the output of the two compression amplifier stages 34 and 36 to a rectifier including diodes CR1 and CR2 which provides positive output pulses from third stage 37 directly to the gate of an analog switch Q1. Negative pulses from the output of third amplifier stage 37 are coupled through inverting amplifier ICF to the gate of analog switch Q1. In this fashion high outputs from third amplifier stage 37, both positive and negative, will drive analog switch Q1 to conduction, and thereby pass higher current through the LED's in packages U1 and U2. As a consequence, photoconductive cell resistances RP1 and RP2 will decrease and the gain of first and second compression amplifier stages 34 and 36 respectively will be decreased to maintain a substantially constant output level at the output of third amplifier stage 37.

The third stage output is also coupled to the input of an amplifier ICD having a pair of Zener diodes VR1 and VR2 in the feedback path therearound. High input signals coming up in less than the response time of the packages U1 and U2 at compression amplifier stages 34 and 36 will be shorted through Zener diodes VR1 and VR2 to thereby reduce the gain at amplifier stage ICD so that the signal at node A, terminal 7B, and node B, terminal 6B, is not allowed to peak above some predetermined maximum level. The purpose of this peak clipping is to preclude high level signals from being delivered to impedance 33 of FIG. 2 and onto the telephone line coupled thereto through transformer T2. The resulting reflected signals from the telephone line might appear as signals initiated at the telephone 11 at the master station. It should be noted that the compression amplifier first and second stages 34 and 36 are adjusted to obtain as much gain as is ever needed in the circuit with the LED's extinguished in packages U1 and U2. Thereafter, conduction by analog switch Q1 serves to decrease the gain in the compression amplifier stages 34 and 36 as hereinbefore described. Packages U1 and U2 act as opto-isolators which decrease the resistance values in the photoconductive cells RP1 and RP2 as the LED portions of packages U1 and U2 are excited. Thus, the gain is reduced in compression amplifier first and second stages 34 and 36. Presently available resistance excursions in the photoconductive cells range from 200 ohms to 1 megohm for example.

The schematic diagram of FIG. 4 shows warning tone timing comparators ICG and ICH which are connected at terminals 10C and 6C to timing circuits 28 and 27 respectively. Terminals 11C in FIG. 4 at the output of timing comparator ICG is seen to be connected to warning tone repetition time adjusting patch 32 as seen in FIG. 2. Warning tone comparator ICH has an output connected to terminal 7C of FIG. 4 which is seen to be connected to the input of the tone oscillator circuit included in tone oscillator, paging amplifier driver and transmission direction control circuit 23.

FIG. 4 further includes a pair of voltage comparators ICI and ICJ having inputs connected to circuit nodes A and B respectively seen in FIG. 3. Further, the high comparator reference voltage obtained at the junction of resistance R14 and R15 of FIG. 2 is shown connected as the reference for comparator ICJ. The low reference voltage level obtained at the junction between resistances R15 and R16 of FIG. 2 is shown in FIG. 4 connected as the reference voltage level to comparator ICI. Consequently, voltage comparator ICI will produce an output when the signal level at circuit node A exceeds the low comparator reference voltage providing an output indicative of the phase of the amplified transmission signals initiated at the remote station. In like manner voltage comparator ICJ will provide an output when the signal at circuit node B exceeds the high reference level connected thereto. Since signals at circuit nodes A and B are similar, but separated in phase by the impedance 33 and the impedance coupled to the two wire phone line terminals 16A and 17A, comparator ICI will produce a phase indicative output which is leading the phase indicative output from comparator ICJ when only amplified signals corresponding to signals initiated at the remote station are present. Consequently, relay 21 is actuated to close the normally open X contacts. It may be seen, however, that the transmission originating at the telephone equipment located at the master station, which is transmitted down the two wire telephone line through transformer T2, will change the phase of the signal at circuit node B relative to the signal at circuit node A. In this manner the complex wave signal at circuit node B will have components which lead the signal at circuit node A, and the phase indicative output from comparator ICJ will lead the phase indicative output from comparator ICI.

With reference to FIG. 5 of the drawings the outputs from voltage comparators ICI and ICJ of FIG. 4 are coupled to terminals 4D and 3D respectively of comparator ICK through input resistors R11 and R12 as shown. Comparator ICK produces an output only when phase indicative output from voltage comparator ICI when the circuit is connected as disclosed herein. Conversely, voltage comparator ICK as shown in FIG. 5 will provide no output when the phase indicative output from voltage comparator ICI leads the phase indicative output provided by voltage comparator ICJ. This being but a description of one preferred embodiment, signal polarities are not intended as any limitation on the scope of the invention disclosed herein. Voltage comparator ICK therefore provides an output when the signal in the complex wave at node B has components leading the signal in the complex wave at node A of FIG. 2. The repetitive warning tone time circuit including resistors R5, R6, R7 and capacitor C6 in FIG. 2 initiates the warning tone timing period at the conclusion of the output from comparator ICK. This is coincident with the time of cessation of a transmission from the telephone 11 at the master station as will be hereinafter explained.

Output from voltage comparator ICK turns on transistor Q2 which in turn charges capacitor C7 of FIG. 5. A voltage comparator ICL has a reference voltage at one input thereof determined by plus V and the voltage division which takes place in the resistance R18 and voltage regulator diode VR1. The output of comparator ICL goes down when capacitor C7 is in a charged condition turning off transistor Q1 which serves to de-energize relay 21 and place the contacts controlled thereby, which are indicated as normally closed, in the closed condition.

FIG. 5 also shows a tone oscillator amplifier ICM having one input coupled to terminal 6D of FIG. 5 which is supplied by the tone timing amplifier ICH at terminal 7C of FIG. 4 and by tone timing amplifier ICG through diode D4. A paging amplifier driver ICN is shown coupled to receive the signals initiated at the telephone 11 at the master station through terminal 5D of FIG. 5. Terminal 5D is coupled through capacitor C4 of FIG. 2 to circuit node B also shown in FIG. 2. The output of amplifier ICN in FIG. 5 is connected to terminal 11D which is coupled through capacitor C5 and transformer T3 of FIG. 2 to the terminals 1A and 2A of FIG. 2, which are the input terminals for paging amplifier 17 as recited previously. Paging amplifier driver ICN transmits preamplified master signals initiated at telephone 11 to paging amplifier 17 as well as warning tones from tone oscillator amplifier ICM, both of which are produced at the remote station through speaker 16.

As discussed above, speaker/microphone 16 serves as a microphone for absorbing and transducing audio energy into remote signals initiated at the remote station. With reference to FIG. 6 of the drawings, when signals initated at the remote station only are present in the circuitry, complex waves existing at circuit nodes A and B of FIG. 2 are represented in FIG. 6 by waves 41 and 42 respectively. Reference 1 indicates the reference voltage for the comparator ICJ and reference 2 represents the reference level for the comparator ICI. These reference levels are actually close to the quiescent level, but are exaggerated here for clarity. The timing between circuit nodes A and B is represented by $\phi$. The quiescent level at circuit nodes A and B is also shown. These reference levels are held at a low value, being approximately 10 millivolts and 30 millivolts, for example, at comparators ICI and ICJ respectively. The low level is maintained for the comparator reference voltages so that comparator output is substantially indicative of complex wave zero crossings. Thus, the actual complex wave form is not a factor in the transmission direction detection. The resulting timing indicative output from comparators ICI and ICJ is shown as substantially square wave indicative outputs 43 and 44 respectively. With square wave indicative output 43 leading square wave indicative output 44, no output occurs from voltage comparator ICK of FIG. 5 as described hereinabove.

The difference in reference levels to voltage comparators ICJ and ICI effectively advances the phase indicative output from comparator ICI for a similar complex wave input due to the higher comparator reference level at comparator ICJ as shown by $\phi$.

Complex waves 46 and 47 illustrate the case wherein the waves contain waves 41 and 42 together with a master signal transmitted from telephone 11, small in amplitude but sufficient to move the leading edge of complex wave 47 at node "B" to a position where the zero crossing at the higher comparator reference voltage is leading the time of zero crossing of complex wave 46 at the lower comparator reference voltage. As a consequence, timing indicative output 49 from comparator ICJ occurs in time before any indicative output 48 from comparator ICI as indicated by $\beta$ and an output 50 is provided at the output of voltage comparator ICK. Relay 21 is therefore deenergized, and the normally closed contacts are closed, connecting paging amplifier 17 to speaker/microphone 16. High gain pre-amplifier 26 is isolated by the opening of the normally open relay contacts, and the signal, if there is any, from the remote station is prevented from appearing at circuit node A.

Complex wave 51 which would have appeared at circuit node A is shown in dashed lines in FIG. 6. The timing indicative output 53 which would have been produced by comparator ICI is also shown in dashed lines. Complex signal 52 from master station 11 at node "B" produces square wave indicative output 54 from comparator ICJ and output 55 is provided at the output of voltage comparator ICK. Therefore, relay 21 remains de-energized under control of master station 11.

The method of sensing transmission direction in a two-way paging system utilizing the structure described herein involves coupling the signal from the remote station microphone 16 to a pair of circuit nodes A and B, and imposing a timing lag in the remote signal at the circuit node B, so that similar signal waveforms appear which are separated by a delay $\phi$. The signal from the master station telephone 11 is also coupled to the circuit node B and the timing of the signals at the two circuit nodes is compared. When the remote signal only is present, the complex waveform at circuit node B lags that at node A. When a master signal exists the complex waveform at circuit node B leads relative to the signal at node A. The remote signal is coupled to the speaker or telephone at the master station when the comparison indicates the complex wave at circuit node B is lagging, and the remote signal is decoupled and the master signal is coupled to the speaker at the remote station when the comparision indicates the complex wave at circuit node B is leading. The method includes compressing the amplified signals initiated at the remote station to obtain relatively constant audio output at the master telephone, and clipping the high level amplified signals from the remote station which rise in times shorter than that in which the compressing step may be performed. The step of warning the remote station when the master station is quiescent and in a listening mode is also available.

A bi-directional paging system transmission direction and control has been disclosed which operates in accordance with master and remote transmission phase relationships, which accepts a telephone equipment impedance within a wide impedance range, which provides relatively constant remote transmission signal levels, and which is insensitive to high transient noise levels or signals which might cause undesired paging system control transfer.

What is claimed is:

1. A voice paging and response system control adapted to be installed between a telephone at a master station and a speaker/microphone at a remote station, and operating in conjunction with a paging amplifier to drive the speaker, comprising an amplifier connected to receive a remote signal initiated at the speaker/microphone and providing an amplified remote signal, means for sensing the amplified remote signal and providing a remote signal timing indicative output, means for sensing the paging signal initiated at the telephone providing a paging signal timing indicative output, means for comparing said paging and remote signal timing indicative output and providing a paging signal leading output when the former leads the latter, and means responsive to said paging signal leading output for coupling the paging amplifier to the speaker, whereby said paging signals are coupled thereto, said last named means operating to decouple the paging amplifier from the speaker and to couple said amplifier to the telephone in the absence of said paging signal leading output.

2. A voice paging and response system control as in claim 1 wherein said amplifier is a compression amplifier providing a substantially constant output for a wide range of levels of said remote signal.

3. A voice paging and response system control as in claim 1 together with a peak clipping circuit which clips high level amplified remote signals having rise times faster than the response of said amplifier, whereby reflected remote signals from the master station appearing as leading paging signal timing indicative output are avoided.

4. A voice paging and response system control as in claim 1 together with means for providing a warning tone signal to the speaker when the telephone is in a listening mode.

5. A voice paging and response system control as in claim 4 together with means for providing a warning tone period so that said warning tone signal repeats periodically, and means for resetting said warning tone period at the termination of said paging signal leading output.

6. A voice paging and response system control as in claim 1 wherein said means for sensing the paging signal includes means for introducing a predetermined lead in said paging signal timing indicative output relative to said remote signal timing indicative output, whereby said paging signal leading output occurs for paging signal lagging amplified remote signal by said predetermined lead and said means responsive to said paging signal provides substantially instantaneous coupling of the paging amplifier to the speaker.

7. A two-way paging system transmission direction sensing and control apparatus disposed between a master station telephone and a remote station speaker/microphone which transmit telephone and microphone signals respectively when exposed to sound energy, and wherein the speaker is driven by a paging amplifier, comprising first means for receiving coupled to the microphone signal providing a first timing indicative output, second means for receiving coupled to both the microphone and telephone signals providing a second timing indicative output, circuit means connected between said first and second means for receiving so that said microphone signal at said first means leads said microphone signal at said second means by a predetermined time, a comparator receiving said first and second timing indicative outputs and providing a coupling/decoupling signal depending on whether said first timing indicative output leads or lags said second timing indicative output respectively, means receiving said coupling/decoupling signal operating to decouple the microphone signal from said first means for receiving and to couple the telephone signal to the paging amplifier when the telephone signal leads the microphone signal and operating otherwise to couple the microphone signal to said first means for receiving and decouple the telephone signal from the paging amplifier, whereby the telephone signal captures and holds transmission control and the microphone signal controls in the absence of the telephone signal.

8. A two-way paging system as in claim 7 wherein said first and second means for receiving are voltage comparators together with means for providing first and second low reference levels thereto respectively, whereby direction sensing is substantially independent of telephone and microphone signal levels and impedance at the master station may fall within a relatively wide range.

9. A two-way paging system as in claim 8 wherein said second low reference level is lower than said first, whereby a predetermined lead is introduced into said second timing indicative output and said means for coupling/decoupling further operates to couple the telephone signal to the paging amplifier when the telephone signal leads the microphone signal by said predetermined lead.

10. The method of sensing transmission direction through an electrical circuit for control of a paging and answering system having a master station and a remote station emitting master and remote electrical signals in response to sound energies at the respective stations, and emitting sound energies from master and remote speakers in response to the electrical signals, comprising the steps of coupling the remote signal to first and second nodes in the electrical circuit, imposing a lag in the remote signal at the second node relative to the first, coupling the master signal to the second node in the electrical circuit, comparing the timing of the signal at the first node with the timing of the signal at the second node and obtaining an indication of lead or lag, whereby a lag in signals received at the second node indicates a quiescent master signal, and a lead indicates transmission from the master station, coupling the remote signals to the master station in response to a lag indication, and decoupling the remote signals and coupling the master signals to the remote speaker in response to a lead indication.

11. The method of claim 10 together with the step of warning the remote station when the master signal is quiescent and the master station is listening.

12. The method of claim 10 wherein the step of coupling the remote signal to the first and second nodes includes the steps of amplifying the remote signal and compressing the amplified remote signal to provide a substantially constant amplified remote signal for various levels of remote signal.

* * * * *